April 18, 1961 H. E. WENING 2,980,569
TABLE TOP CONSTRUCTION MATERIAL
Filed May 18, 1956

INVENTOR.
HERMAN E. WENING
BY
ATTORNEY

United States Patent Office 2,980,569
Patented Apr. 18, 1961

2,980,569
TABLE TOP CONSTRUCTION MATERIAL
Herman E. Wening, Dayton, Ohio, assignor to General Motors Corporation, Detroit, Mich., a corporation of Delaware Filed May 18, 1956, Ser. No. 585,907
1 Claim. (Cl. 154—45.9)

This invention relates to kitchen furnishings and the like and in particular to sheet material for working surfaces of kitchen tables, cabinets and the like.

Common subject matter is disclosed in the copending application S.N. 544,840, filed November 3, 1955, and assigned to the assignee of the present invention.

In the modern kitchen it is customary to provide working surfaces on the tops of various furnishings such as tables, cabinets, sinks and the like. It is highly desirable that these working surfaces be formed of a material capable of withstanding the working conditions to which such surfaces are normally exposed and retain an attractive appearance over a reasonable period of time. It is further desirable that such surface materials be economical and provided in a form in which they may be conveniently and neatly applied.

It is accordingly an object of this invention to provide a sheeted covering material for kitchen tables, cabinets and the like which is non-porous and resilient, highly resistant to attack or penetration by grease and oil, capable of withstanding temperatures up to 400° F. without discoloration or deformation, and receptive to attractive coloration.

A more specific object of the present invention is to provide a laminated sheet material including a layer of resinous material comprising a blend of rubbery copolymers including a substantial proportion of butadiene-acrylonitrile copolymers and a relatively hard non-elastic styrene-butadiene copolymers, bonded to a metal backing sheet.

Yet another object of this invention is to provide a working surface on a kitchen work table or the like which comprises a sheet of material including a blend of rubber-like butadiene-acrylonitrile copolymers and a relatively hard resinous styrene-butadiene copolymer, together with fillers and necessary accelerators, plasticizers and color providing materials.

Further objects and advantages of the present invention will be apparent from the following description, reference being had to the accompanying drawings wherein preferred embodiments of the present invention are clearly shown.

Figure 1:
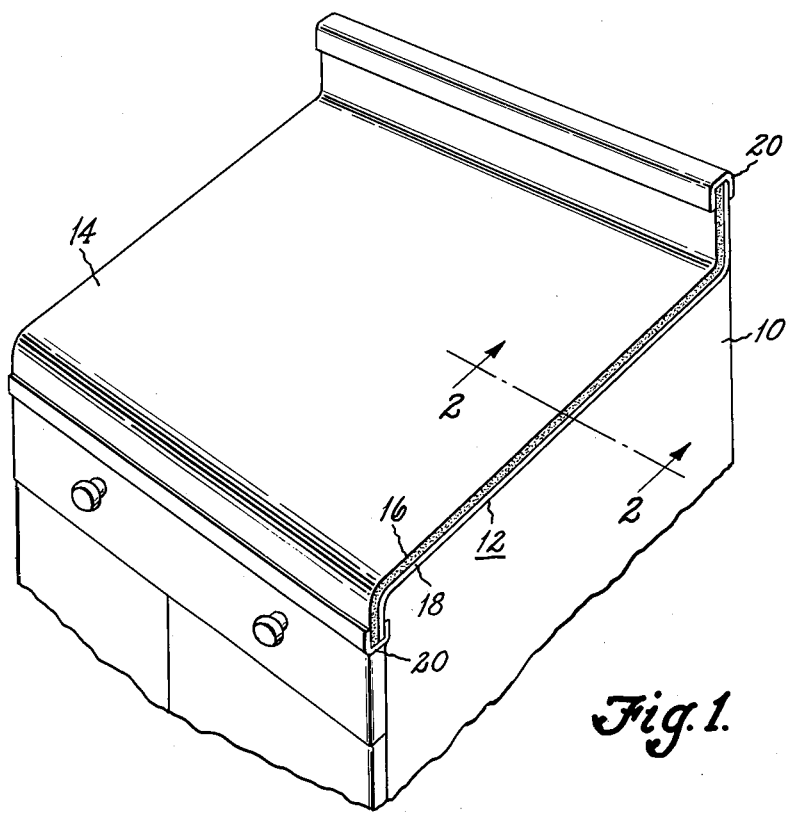
Figure 1 is a perspective view of a work table having associated therewith a covering having a working surface made in accordance with the present invention.
Figure 2:
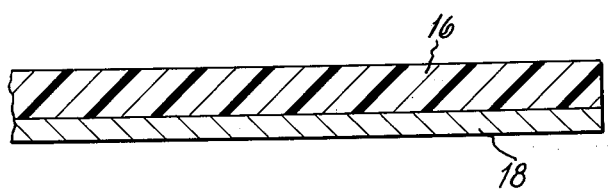
Figure 2 is an elevational cross sectional view of the table covering structure taken along line 2—2 of Figure 1.

In accordance with the present invention and referring to the drawings, a kitchen cabinet 10 is provided with a laminated top covering structure 12 which forms a kitchen working surface 14. The cabinet 10 may be a kitchen sink, counter, table or any similar furnishing on which may be desired to provide a working surface.

The covering structure or top 12 is preferably in the form of a laminated sheet consisting of a resilient resinous outer layer 16 bonded to a metal backing or support member 18 of, for example, steel or aluminum. The edges of the laminated sheet are preferably provided with a metal protective molding 20.

The resilient resinous layer 16 is formed of a composition of matter in accordance with the following recipe:

| | Range in parts by weight |
|---|---|
| Butadiene-acrylonitrile copolymer | 10 to 25 |
| Butadiene-styrene copolymer | 0 to 15 |
| Styrene-butadiene copolymer | 5 to 15 |
| Coloring agent | .5 to 2.0 |
| Clay (hard clay) | 30 to 50 |
| Titanium dioxide | 10 to 30 |
| Wax (microcrystalline wax) | .3 to 1 |
| Anti-oxidant | .1 to .3 |
| Plasticizer | 2 to 5 |
| Zinc oxide | 1 to 3 |
| Organic accelerator | .3 to .7 |
| Sulfur | .5 to 1.5 |

The above butadiene-acrylonitrile copolymer is made up of acrylonitrile monomers in a range of from 35 to 50% and the corresponding balance of butadiene monomers, so as to provide the copolymer with an essentially rubber-like character. Similarly the butadiene-styrene copolymer is made up of styrene monomers in a range of from 20 to 30% and the corresponding balance of butadiene monomers, so as to provide a copolymer with a rubber-like character. The styrene-butadiene copolymer has styrene monomers in a range of from 60 to 85% and the corresponding balance of butadiene monomers, so as to provide the copolymer with an essentially hard non-elastic resinous character.

The titanium dioxide provides the composition with an essentially white color which may be colored as desired by the addition of suitable coloring agents such as organic and inorganic dyes which are well known in the art.

The clay is known as "hard clay" in the art and is added as a filler which is highly resistant to heat. Other fillers such as wood flour, ground asbestos, pumice and diatomaceous earth may also be used. The wax acts as a "blooming" agent whereby in the course of its use the composition 16 is provided with a self-polishing feature. The preferred wax is a microcrystalline wax which provides the composition with a high sun resistance; however paraffin wax may be suitably used. The plasticizer is preferably a light mineral oil. Other plasticizers which may be used include di-butyl phthalate and di-octyl phthalate. The anti-oxidant is preferably a non-staining compound such as 2,2′ methylene-bis (4 ethyl-6 tertiary butyl phenol). Other suitable nonstaining antioxidants include a mixture of mono di-heptyl di-phenyl amines, 4,4 thiobis-(6-tert-butyl-m-cresol) and thiobis-(di-sec-amyl phenol). The organic accelerator is preferably mercaptobenzothiazole which reacts with the zinc oxide curing agent to form a zinc salt which in turn reacts with the sulfur to form a sulfide acting as a faster curing agent than the sulfur alone. Other accelerators such as benzothiazyl disulfide and tetraethylthiuram disulfide may be used.

The essential ingredients in the above recipe include the butadiene-acrylonitrile and styrene-butadiene copolymers and it will be understood that the filler may be any equivalent heat resistant material conventionally used in the art and the curing agents, plasticizer and anti-oxidant may be replaced by various equivalent materials which are well known in the art. The titanium dioxide acts as a filler and its capacity to provide the composition with a white-like color permits the composition to be colored in various pastel shades by the addition of suitable coloring agents. The quantity of titanium dioxide used is determined by the degree of whiteness desired in the composition which in turn is determined by the coloring effect desired. The above stated proportions have been found suitable for a wide variety of coloration effects.

As indicated in the above recipe a portion of the butadiene-acrylonitrile copolymer rubber-like constituent may be replaced by a rubber-like butadiene-styrene copolymer to an extent of approximately one-half of the former or to an extent whereby the composition will not lose its property of resisting grease and oils as may come into contact with the material in a kitchen or the like. In the above recipe the ratio of the rubber-like portion, e.g., the butadiene-acrylonitrile plus the butadiene-styrene copolymers, to the resinous portion, e.g., the styrene-butadiene copolymer, is preferably maintained in the range of about 2 to 1 to 3 to 1. The ratio of all of the polymeric material, e.g., the butadiene-acrylonitrile, butadiene-styrene and styrene-butadiene copolymers, to the filler material ratio, e.g., the clay and titanium dioxide, is preferably maintained in a range of about .35 to 1 to .60 to 1. The titanium dioxide forms a sufficient proportion of the filler to render the resulting composition of a whitish character which is receptive to pastel coloration.

The preferred composition of the working surface 16 is as follows:

| | Parts |
|---|---|
| Butadiene-acrylonitrile copolymer | 11 |
| Butadiene-styrene copolymer | 11 |
| Styrene-butadiene copolymer | 8 |
| Coloring agent | 1 |
| Titanium dioxide | 15 |
| Clay | 46.75 |
| Wax | .5 |
| Anti-oxidant | .25 |
| Plasticizer | 3 |
| Zinc oxide | 2 |
| Organic accelerator | .5 |
| Sulfur | 1 |

In the above preferred composition the ratio of the rubber-like component to the resin component is about 2.75 to 1 while the ratio of the polymeric material to the filler material is about .5 to 1. The butadiene-acrylonitrile copolymer contains about 60% butadiene monomers and correspondingly about 40% acrylonitrile monomers. The butadiene-styrene copolymer contains about 77% butadiene monomers and correspondingly about 23% styrene monomers. The styrene-butadiene copolymer contains about 85% styrene monomers and correspondingly about 15% butadiene monomers.

In manufacturing the laminated structure 12 the copolymers are thoroughly mixed on rubber rolls together with the filler, pigment, accelerator, vulcanizing agents, and other addition materials, and are rolled out into a plastic sheet 16 of a desired thickness. The sheet 16 is then applied to a metal base or support 18 which has been previously coated with a layer of adhesion cement and the assembly is then vulcanized preferably under pressure for about 15 minutes at about 320° F. Neither the temperature or pressure is limiting as these may vary as is well known in the art.

In order to provide an attractive color structure the sheet 16 may be formed in a manner disclosed in the copending application S.N. 544,840, after which it is bonded to the metal backing member 18 and vulcanized.

The adhesion cement for bonding the resinous layer 16 to the metal layer 18 may be any of the well known cements used to bond resinous or elastomeric material to metal. Examples of suitable cements include those disclosed in the Brams Patent 2,424,736 involving natural rubber, polychloroprene or the butadiene-styrene copolymer; and the chlorinated rubber-type cements such as "Loxite" manufactured by The Firestone Tire and Rubber Company and disclosed in the Kuhn Patent 2,581,920 and "Ty-Ply" manufactured by the Marbon Corporation and disclosed in the Winkelmann et al. Patents 2,147,620 and 2,259,190.

The vulcanized structure 12 is ideally suited as a working surface for kitchen, restaurant and similar furnishings since it may be formed to present a neat and attractive appearance. The outer or surface layer 16 is highly resistant to the solvent action of greases and oils and is capable of withstanding temperatures of 380° to 400° F. without discoloration or deformation. The structure 12 forms a non-porous impervious structure, the surface of which may be readily cleaned and maintained due to the self-polishing nature of the layer 16. Finally the laminated structure 12 may be readily applied as a top for furnishings with a minimum of support due to its relatively rigid metal backing. Although the preferred embodiment of the present invention is in the form of a sheet material for use as a top surface material for kitchen furnishings it is obvious that the properties of the resinous material 16 is equally suited for many other uses such as floor coverings, floor mats and other surfaces which are normally exposed to conditions of considerable wear and heat.

While the embodiments of the present invention as herein disclosed constitute preferred forms, it is to be understood that other forms might be adopted.

What is claimed is as follows:

In a laminated table top structure comprising a sheet metal supporting member, having a vulcanized tough resilient oil and heat resistant plastic sheet bonded coextensively to the sheet metal supporting member wherein said plastic sheet comprises a base material of a homogeneous rubber-like material consisting of a copolymer of a rubbery butadiene-acrylonitrile copolymer consisting of about 60% butadiene and 40% acrylonitrile and a rubbery butadiene-styrene copolymer consisting of about 77% butadiene and 23% styrene, said rubber-like material being a mixture in substantially equal proportions of the two rubbery copolymers, a relatively non-elastic resinous material consisting of a styrene-butadiene copolymer consisting of about 85% styrene and about 15% butadiene, and heat resistant filler material comprising titanium dioxide, said materials being present in ratio ranges by weight of two to three parts of the rubber-like material to one part of the resinous material and .35 to .60 parts of the rubber-like material plus the resinous material to one part of the filler material.

References Cited in the file of this patent
UNITED STATES PATENTS

| | | |
|---|---|---|
| 2,397,050 | Sarbach | Mar. 19, 1946 |
| 2,405,038 | Jennings | July 30, 1946 |
| 2,439,027 | Stanitz | Apr. 6, 1948 |
| 2,473,319 | Winkelmann | June 14, 1949 |
| 2,484,705 | Gray | Oct. 11, 1949 |
| 2,498,652 | Daly | Feb. 28, 1950 |
| 2,576,148 | Schechtman | Nov. 27, 1951 |
| 2,581,907 | Smith et al. | Jan. 8, 1952 |
| 2,581,920 | Kuhn | Jan. 8, 1952 |
| 2,589,502 | Lurie | Mar. 18, 1952 |
| 2,592,550 | Engel et al. | Apr. 15, 1952 |
| 2,614,014 | Stanitz | Oct. 14, 1952 |
| 2,617,129 | Petze | Nov. 11, 1952 |
| 2,624,682 | Hazeltine | Jan. 6, 1953 |
| 2,638,462 | Borders | May 12, 1953 |
| 2,646,326 | Stanitz | July 21, 1953 |
| 2,654,648 | Burke | Oct. 6, 1953 |
| 2,681,898 | Daly | June 22, 1954 |